(12) United States Patent
Grill et al.

(10) Patent No.: US 11,242,931 B2
(45) Date of Patent: Feb. 8, 2022

(54) SEALING RING ASSEMBLY

(71) Applicant: Mahle International GmbH, Stuttgart (DE)

(72) Inventors: Oliver Grill, Moetzingen (DE); Achim Herber, Vaihingen (DE)

(73) Assignee: Mahle International GmbH

( * ) Notice: Subject to any disclaimer, the term of this patent is extended or adjusted under 35 U.S.C. 154(b) by 323 days.

(21) Appl. No.: 16/404,702

(22) Filed: May 6, 2019

(65) Prior Publication Data
US 2019/0360593 A1 Nov. 28, 2019

(30) Foreign Application Priority Data
May 7, 2018 (DE) ...................... 10 2018 207 053.9

(51) Int. Cl.
F16J 15/12 (2006.01)
F01D 25/24 (2006.01)
F01D 25/08 (2006.01)

(52) U.S. Cl.
CPC ............ F16J 15/121 (2013.01); F01D 25/24 (2013.01); *F01D 25/08* (2013.01)

(58) Field of Classification Search
CPC ......... F01D 25/24; F01D 25/08; F16J 15/121; F16J 15/128
See application file for complete search history.

(56) References Cited

U.S. PATENT DOCUMENTS

| | | | | |
|---|---|---|---|---|
| 3,601,417 A | * | 8/1971 | Szepesvary | F16J 15/3252 277/556 |
| 5,009,435 A | * | 4/1991 | Villanyi | F16J 15/3232 277/552 |
| 6,102,409 A | * | 8/2000 | Furuyama | F16J 15/3228 277/559 |
| 6,428,013 B1 | * | 8/2002 | Johnston | F16J 15/3228 277/400 |
| 6,517,083 B2 | * | 2/2003 | Yamada | F16J 15/3228 277/559 |
| 6,676,132 B1 | * | 1/2004 | Takebayashi | F16J 15/002 277/560 |
| 6,702,294 B2 | * | 3/2004 | Sassi | B22D 11/1287 277/551 |
| 6,736,403 B2 | * | 5/2004 | Kreutzer | F16J 15/3232 277/551 |
| 7,182,346 B2 | * | 2/2007 | Yamamoto | F16J 15/3232 277/551 |

FOREIGN PATENT DOCUMENTS

DE 10 2008 061 870 A1 6/2010
DE 11 2010 004 180 T5 9/2012

OTHER PUBLICATIONS

English abstract for DE-10 2008 061 870.
English abstract for DE-11 2010 004 180.

* cited by examiner

*Primary Examiner* — Igor Kershteyn
(74) *Attorney, Agent, or Firm* — Fishman Stewart PLLC

(57) ABSTRACT

A sealing ring assembly for connection of an exhaust gas cooler to a coolant line may include a carrier ring composed of a plastic, a sealing ring composed of a sealing material connected to the carrier ring; and a heat protection element connected to the carrier ring and surrounding the carrier ring on a radial outer side defining an air gap therebetween.

20 Claims, 2 Drawing Sheets

SEALING RING ASSEMBLY

CROSS-REFERENCE TO RELATED APPLICATIONS

This application claims priority to German Patent Application No. DE 10 2018 207 053.9 filed on May 7, 2018, the contents of which are hereby incorporated by reference in their entirety.

TECHNICAL FIELD

The present invention relates to a sealing ring assembly for connection of an exhaust gas cooler to a coolant line. The invention also relates to an exhaust gas cooler comprising such a sealing ring assembly.

BACKGROUND

To be able to fulfill their function, namely to cool exhaust gas, exhaust gas coolers are typically supplied with coolant. The connection to a coolant line, which is connected to a cooling circuit of an internal combustion engine, thereby takes place via sealing elements, which have the function of connecting the exhaust gas cooler to the cooling circuit of the internal combustion engine without leakage and to simultaneously compensate tolerances and temperature-related expansions between the coolant line and the exhaust gas cooler.

It is known thereby to use combined sealing elements, which have a carrier ring made of plastic and a sealing ring made of a sealing material, for example rubber. However, such sealing elements comprising a carrier ring made of plastic have only a limited temperature usage range of up to 180°. In the area of the exhaust gas manifold, temperature of up to 700° C. can appear, however, due to the exhaust gas temperatures, whereby sealing elements comprising carrier rings made of plastic cannot be used any longer. This is why the carrier ring frequently has to be made of metal in this area, which leads to significantly higher costs of the sealing element as compared to sealing elements comprising carrier rings made of plastic.

The present invention thus deals with the problem of specifying a sealing ring assembly, in the case of which a carrier ring made of plastic can be used in spite of high temperatures.

SUMMARY

This problem is solved according to the invention by means of the subject matter of the independent claim(s). Advantageous embodiments are the subject matter of the dependent claim(s).

The present invention is based on the general idea of providing a heat protection element, which protects a carrier ring made of plastic of the sealing assembly against a direct heat radiation and thus provides for the use of such a carrier ring made of plastic, for the first time in the case of a sealing ring assembly, which is conventional per se. The sealing ring assembly according to the invention thereby serves for connection of an exhaust gas cooler to a coolant line of an internal combustion engine and has the above-mentioned carrier ring made of plastic as well as a sealing ring made of a sealing material, for example rubber, which is connected to said carrier ring. A heat protection element, which is connected to the carrier ring and surrounds the latter on a radial outer side by forming an air gap, is additionally provided according to the invention. A thermal insulation of the carrier ring, which is so large that the carrier ring can be made of plastic, is attained by means of this air gap. Compared to sealing ring assemblies, which have been used to date in this area and which are known from the prior art, comprising a carrier ring made of metal, it is thus possible for the first time to use a carrier ring made of plastic and to upgrade the latter by means of the heat protection element, which can be produced in a comparatively cost-efficient manner and which can simultaneously be mounted in a simple manner, in such a way that it can be used in the area of the exhaust gas cooler, without the carrier ring made of plastic being damaged thereby.

In the case of an advantageous further development of the solution according to the invention, the heat protection element is made of metal, in particular of sheet metal. Such an embodiment does not only provide for a cost-efficient, but also for a high-quality manufacture, for example by means of simple punching and forming processes.

In the case of a further advantageous embodiment of the solution according to the invention, the heat protection element is interlocked with the carrier ring. By means of such an interlocking or a clipping on, respectively, a significantly simplified but simultaneously captive clamping of the heat protection element on the carrier ring can be attained, wherein such locking or clip-on connections, respectively, cannot only be produced in a cost-efficient manner, but—as mentioned—can also be mounted more easily.

On its jacket side, the heat protection element advantageously has catch contours, for example catch noses, which are directed inwardly and which engage behind a counter catch contour on the carrier ring side. The catch contours on the heat protection element side can thereby also take place by means of a comparatively simple forming process, for example a buckling of such catch noses.

In the case of a further advantageous embodiment of the solution according to the invention, the heat protection element has a larger outer diameter than the carrier ring and surrounds the latter radially on the outside by forming an air gap. A thermally insulating air layer, which significantly reduces a thermal stress caused by radiant heat emanating from the housing of the exhaust gas cooler and lowers it to a level, for to below 200° C., can be formed by means of the air gap, which is arranged radially outside of the carrier ring, between the carrier ring and the heat protection element, whereby the use of a carrier ring made of plastic becomes possible. Depending on the occurring temperatures, the radial thickness of the air gap can thereby be adapted accordingly.

Advantageously, the carrier ring is made of polyphthalamide (PPA) or of polyamide (PA), in particular of PA66. Polyphthalamide is a semi-aromatic polyamide, which has an extraordinary heat resistance and which is thus already particularly suitable for the use in a carrier ring. It furthermore has a high chemical resistance and a good strength as well as stiffness at high temperatures, which is also of great advantage for the use in a sealing ring assembly on an exhaust gas cooler. Polyamides also have a high temperature resistance as well as a high strength and stiffness at high temperatures. In particular the plastic polyamide 66 (PA66) thereby has a very high hardness, stiffness and heat resistance and is thus particularly suitable for the use as carrier ring in the case of the sealing ring assembly according to the invention, even as unreinforced plastic. It goes without saying that it is also conceivable that such a carrier ring can be reinforced by means of corresponding fibers, for example glass fibers or carbon fibers.

In addition or in the alternative, the sealing ring can be made of rubber. Rubber is a caoutchouc product and provides for a particularly good sealing effect, in particular with respect to metallic sealing partners.

In the case of a further advantageous embodiment of the solution according to the invention, the heat protection element has, on its front side, positioning openings, with which the carrier ring engages with corresponding positioning contours. An unambiguous and defined position fixation of the heat protection element on the carrier ring is thereby possible in a comparatively simple manner. Such positioning openings can be realized, for example, via openings, which extend in the circumferential direction and with which the carrier ring engages with its corresponding positioning contours.

In a further advantageous embodiment of the solution according to the invention, the sealing ring has a first step, on which the carrier ring bears with a corresponding second step. A comparatively large connecting area between the carrier ring and the sealing ring can be attained via such a first and second step, wherein the sealing ring can be, for example, thermally connected, adhered to the carrier ring at this connecting area, or the sealing ring can also be injection molded to the carrier ring. Such steps also form a mounting simplification.

The present invention is further based on the general idea of equipping an exhaust gas cooler with such an above-described sealing ring assembly, via which a coolant line is connected to a housing of the exhaust gas cooler. The comparatively high heat emission of the housing of the exhaust gas cooler can thereby be kept away from an impact on the carrier ring or the sealing ring, respectively, because the heat protection element forms an effective thermal insulation by forming the air gap. Generally speaking, a carrier ring made of plastic and a sealing ring made of rubber can thus be easily combined with the heat protection element according to the invention, in order to produce the sealing ring assembly according to the invention.

Further important features and advantages of the invention follow from the subclaims, from the drawings, and from the corresponding figure description based on the drawings.

It goes without saying that the features, which are mentioned above and which will be described below, cannot only be used in the respectively specified combination, but also in other combinations or alone, without leaving the scope of the present invention.

Preferred exemplary embodiments of the invention are illustrated in the drawings and will be described in more detail in the description below, whereby identical reference numerals refer to identical or similar or functionally identical components.

BRIEF DESCRIPTION OF THE DRAWINGS

In each case schematically.

DETAILED DESCRIPTION

Figure 1:
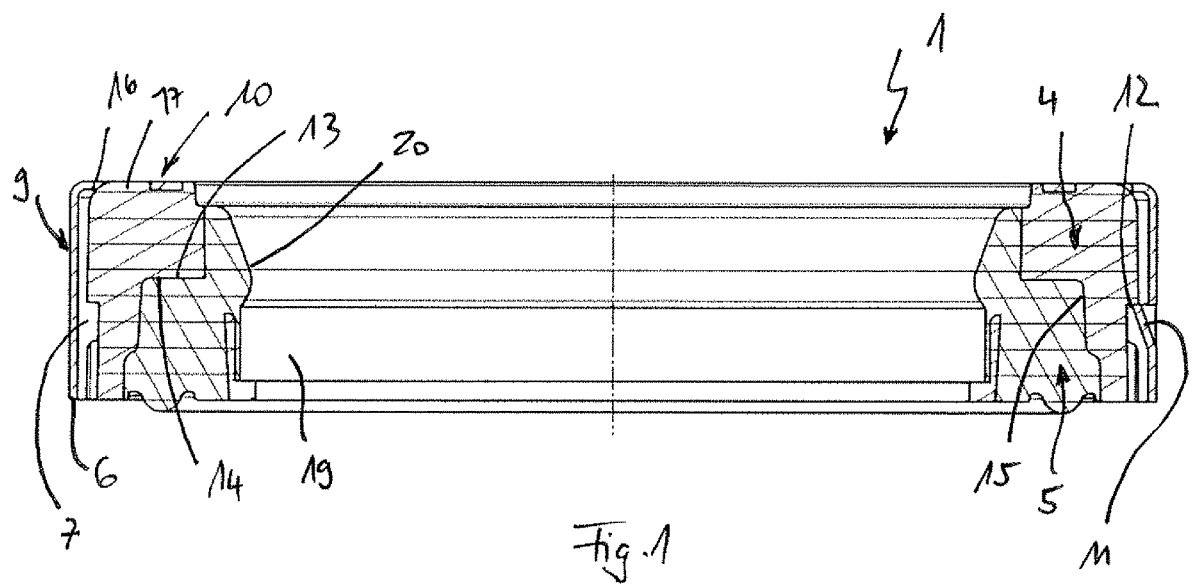
FIG. 1 shows a sectional illustration through a sealing ring assembly according to the invention.
Figure 2:
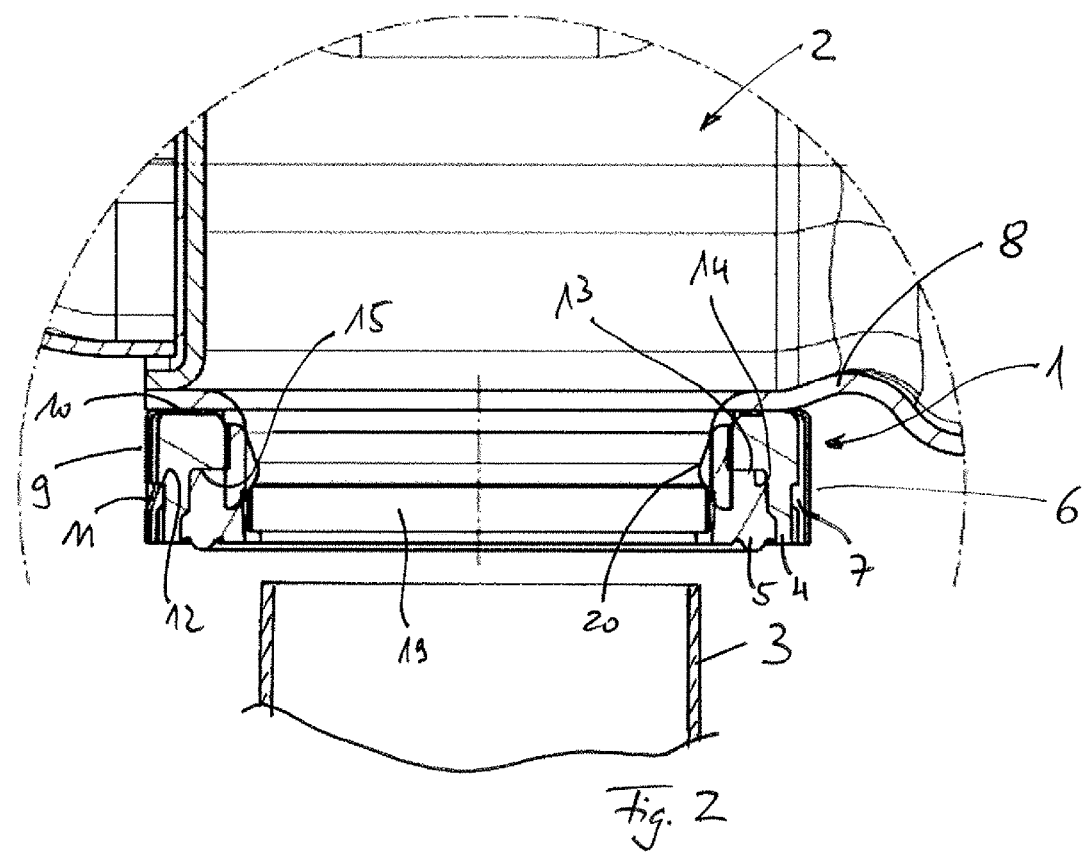
FIG. 2 shows a sectional illustration through an exhaust gas cooler according to the invention comprising such a sealing ring assembly according to the invention.
Figure 5:
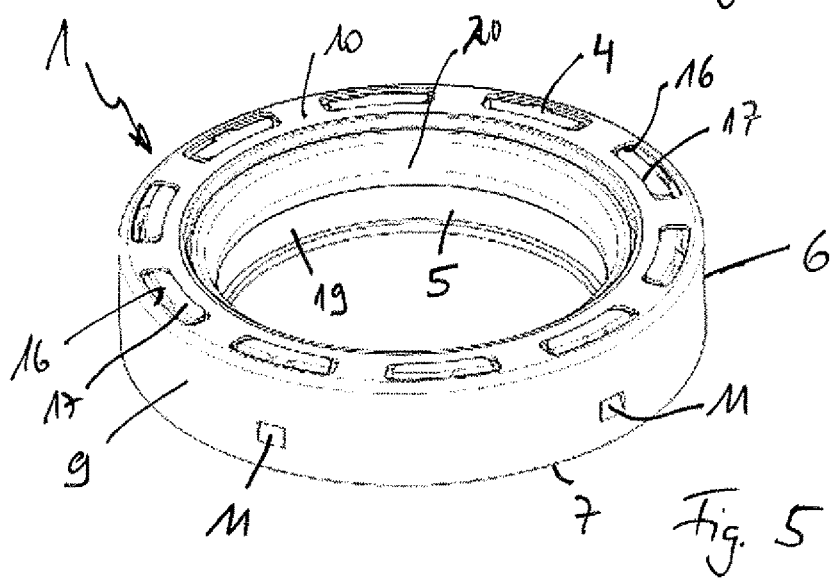
FIG. 5 shows a completely mounted sealing ring assembly.

According to FIGS. 1, 2 and 5, a sealing ring assembly 1 according to the invention for connection of an exhaust gas cooler 2 to a coolant line 3 (see FIG. 2) has a carrier ring 4 made of plastic, comprising a sealing ring 5 made or a sealing material, for example rubber, which is connected to said carrier ring 4. A heat protection element 6, which is connected to the carrier ring 4, in particular interlocked or clipped on, and which surrounds said carrier ring on a radial outer side by forming an air gap 7, is also provided. A thermal insulation of the carrier ring 4, which is made of plastic, against a heat exposure of a housing 8 of the exhaust gas cooler 2 can be attained by means of this air gap 7, namely to such an extent that the carrier ring 4 can be made of plastic and does not have to be made of metal, which would make the production thereof significantly more expensive.

The heat protection element 6 is thereby made of metal, in particular of sheet metal, and can be made, for example, as cost-efficient shaped sheet metal part. In addition to a cost-efficient producibility, a high-quality manufacture is thereby also possible. When looking at the heat protection element 6 according to FIGS. 1, 2 as well as 4 and 5, it can be seen that it has a jacket side 9 and a front side 10, which runs essentially orthogonally thereto. For the simple and simultaneously reliable mounting of the heat protection element 6 on the carrier ring 4, in particular also with regard to a captive securing, the heat protection element 6 has, on its jacket side 9, for example catch contours 11 (see FIGS. 1, 2 as well as 4 and 5), which are directed inwardly and which engage behind a counter catch contour 12 on the carrier ring side. The catch contours 11 can thereby be embodied as simple catch noses, which are produced in a simple punching or forming step, respectively. A reliable and captive clamping of the heat protection element 6 on the carrier ring 4 can be attained by means of these catch contours 11.

When looking at the heat protection element 6 more closely, it can be seen that it has a larger outer diameter than the carrier ring 4 and surrounds the latter radially on the outside by forming a or the air gap 7, respectively. The larger the air gap 7 is thereby, the larger the insulating effect is as well.

The carrier ring 4 can be made, for example, of polyphthalamide (PPA) or polyamide (PA), in particular of PA66. Such polyamides, which belong to the nylon group, have an extremely high temperature resistance as well as strength and are thus particularly preferred for the use as carrier ring in the sealing ring assembly according to the invention. The sealing ring 5 itself can be made, for example, of rubber.

It can also be seen from FIG. 1 that the sealing ring 5 has a sealing lip 19, which effects a sealing with respect to the coolant line 3. The sealing lip 19 is thereby formed integrally with the sealing ring 5. In addition, the sealing ring 5 can also have a sealing ring bead 20, which seals the sealing ring assembly 1 with respect to the housing 8, in particular with respect to a connecting piece on the housing 8.

When looking at FIGS. 1 and 2, it can be seen that the sealing ring 5 is arranged radially on the inside and is surrounded by the carrier ring 4 radially on the outside. The sealing ring 5 thereby has a first step 13, step, on which the carrier ring 4 bears with a corresponding second step 14. The steps 13, 14 thereby form a part of a ring-shaped connecting area 15, via which the carrier ring 4 is connected to the sealing ring 5, for example welded or adhered. It goes without saying that an injection molding of the sealing ring 5 to the carrier ring 4 or vice versa is conceivable as well.

When looking at the heat protection element 6 more closely, it can be seen that, on the front side 10 thereof, position openings 16 (see in particular FIGS. 1 as well as 4 and 5) are provided, with which the carrier ring 4 engages with corresponding positioning contours 17. An exact alignment of the carrier ring 4 relative to the heat protection element 6 can be attained via such positioning openings 16 and positioning contours 17. The positioning openings 16 are thereby embodied as elongated hole openings, which are interrupted in the circumferential direction, in the manner of ring segments.

Figure 3:
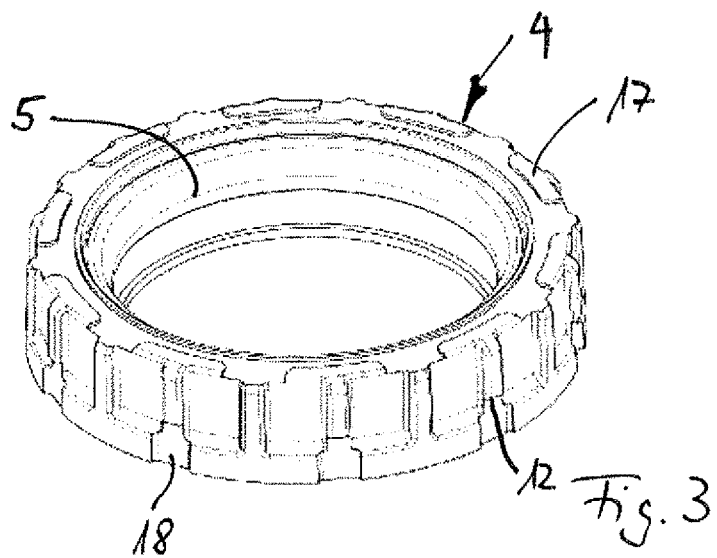
FIG. 3 shows a view onto a sealing ring, which is combined with a carrier ring.
Figure 4:
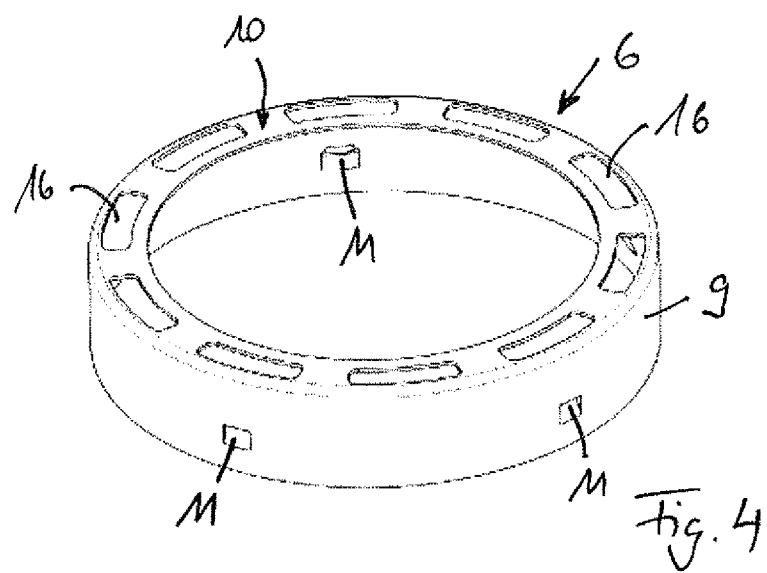
FIG. 4 shows a view onto a heat protection element.

When looking at the carrier ring 4 according to FIG. 3 even more closely, it can be seen that, on its outside, it has recesses 18, which provide for an additional ventilation of the air gap 7 and thus an increase of the thermal insulating effect.

A sealing assembly 1, which is attached to the exhaust gas cooler 2, can be seen in FIG. 2, wherein the sealing assembly 1 is separated from the housing 8 of the exhaust gas cooler 2 via the heat protection element 6. The carrier ring 4 is additionally protected against a lateral heat radiation by means of the jacket side 9 of the heat protection element 6 and the air gap 7 arranged therebelow.

In summary, with the sealing assembly 1 according to the invention, a cost-efficient solution can be achieved which can be used simultaneously at high temperatures in exhaust gas coolers 2 of up to 700° C. without thereby having to use an expensive carrier ring made of metal, the production of which is comparatively complex. Instead, a carrier ring 4 made of plastic can be used, which is protected against a direct heat radiation only via a cost-efficient and highly effective heat protection element 6.

The invention claimed is:

1. A sealing ring assembly for an exhaust gas cooler, comprising:
   a carrier ring composed of a plastic;
   a sealing ring composed of a sealing material, the sealing ring connected to the carrier ring and configured to engage a coolant line; and
   a heat protection element structured and arranged to protect the carrier ring from radiated heat of the exhaust gas cooler, the heat protection element connected to the carrier ring and surrounding the carrier ring on a radial outer side defining an air gap therebetween.

2. The sealing ring assembly according to claim 1, wherein:
   the heat protection element is composed of a metal;
   the carrier ring is composed of at least one of a polyphthalamide and a polyamide; and
   the sealing ring is composed of a rubber.

3. The sealing ring assembly according to claim 1, wherein the heat protection element has a jacket side and a front side, which extends essentially orthogonally thereto.

4. The sealing ring assembly according to claim 1, wherein the heat protection element is interlocked with the carrier ring.

5. The sealing ring assembly according to claim 3, wherein, on the jacket side, the heat protection element includes a plurality of catch contours projecting radially inward which engage behind a counter catch contour disposed on a side of the carrier ring.

6. The sealing ring assembly according to claim 1, wherein:
   the sealing ring is disposed radially inside of the carrier ring, which is disposed radially inside of and surrounded by the heat protection element; and
   the sealing ring, the carrier ring, and the heat protection element are sequentially stacked on top of one another in an axial direction.

7. The sealing ring assembly according to claim 3, wherein the heat protection element includes, disposed on the front side, a plurality of positioning openings with which the carrier ring engages via a plurality of corresponding positioning contours.

8. The sealing ring assembly according to claim 1, wherein:
   the sealing ring includes a first step and the ring carrier includes a complimentary second step; and
   the carrier ring is arranged axially on the sealing ring such that the carrier ring bears on the first step via the second step.

9. The sealing ring assembly according to claim 1, wherein the carrier ring has an outer circumferential surface and includes a plurality of ventilation recesses disposed in the outer circumferential surface.

10. The sealing ring assembly according to claim 1, wherein the sealing ring includes an axially extending sealing lip, the sealing lip disposed radially inside of and radially spaced apart from the sealing ring such that an annular space is defined therebetween.

11. The sealing ring assembly according to claim 1, wherein the sealing ring includes:
    a sealing lip disposed on a radially inner side of the sealing ring adjacent to a first axial end of the sealing ring, the sealing lip configured to sealingly engage the coolant line; and
    a sealing bead disposed on the radially inner side of the sealing ring adjacent to a second axial end of the sealing ring opposite the first axial end, the sealing bead configured to sealingly engage a connecting piece of an exhaust gas cooler housing.

12. A sealing ring assembly for connection of an exhaust gas cooler to a coolant line, comprising:
    a carrier ring composed of a plastic;
    a sealing ring composed of a sealing material and connected to the carrier ring;
    a heat protection element connected to the carrier ring and surrounding the carrier ring on a radial outer side such that an air gap is defined therebetween; and
    wherein the sealing ring, the carrier ring, and the heat protection element are sequentially stacked on top of one another in an axial direction.

13. An exhaust gas cooler comprising a housing, a coolant line, and a sealing ring assembly connecting the coolant line to the housing, the sealing ring assembly including:
    a carrier ring composed of a plastic;
    a sealing ring composed of a sealing material connected to the carrier ring; and
    a heat protection element connected to the carrier ring and surrounding the carrier ring on a radial outer side defining an air gap therebetween.

14. The exhaust gas cooler according to claim 13, wherein the heat protection element is interlocked with the carrier ring.

15. The exhaust gas cooler according to claim 13, wherein:
    the heat protection element has a jacket side and a front side extending orthogonally thereto;

the heat protection element includes a plurality of catch contours disposed on the jacket side and projecting radially inward; and the carrier ring includes a plurality of counter catch contours engaging with the plurality of catch contours.

16. The exhaust gas cooler according to claim 13, wherein the heat protection element has a larger outer diameter than the carrier ring.

17. The exhaust gas cooler according to claim 13, wherein:

the carrier ring is composed of a polyphthalamide; and
the sealing ring is composed of a rubber.

18. The exhaust gas cooler according to claim 13, wherein the sealing ring is surrounded by the carrier ring radially on an outside.

19. The exhaust gas cooler according to claim 13, wherein:

the heat protection element has a jacket side and a front side extending orthogonally thereto; and the heat protection element includes a plurality of positioning openings disposed on the front side with which the carrier ring engages via a plurality of corresponding positioning contours.

20. The exhaust gas cooler according to claim 13, wherein:

the sealing ring includes a first step on which the carrier ring bears via a corresponding second step; and
the sealing ring includes a sealing lip.

\* \* \* \* \*